Patented July 22, 1952

2,604,474

UNITED STATES PATENT OFFICE 2,604,474

PROCESS FOR THE PREPARATION AND MANUFACTURE OF 6-METHOXY-8-(4-AMINO - 1 - METHYLBUTYLAMINO)-QUINOLINE

Robert C. Elderfield, Hastings on Hudson, and Eleanor Werble, New York, N. Y., assignors to the United States of America as represented by the Administrator, Federal Security Agency No Drawing. Application June 8, 1950,
Serial No. 166,991

4 Claims. (Cl. 260—286)

(Granted under the act of March 3, 1883, as
amended April 30, 1928; 370 O. G. 757)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to the production of primaquine and its homologs. More particularly, it relates to the production thereof beginning with readily available raw materials.

Primaquine is the name given to the chemical identified as 6-methoxy-8-(4-amino-1-methylbutylamino) quinoline as described in the Journal of the American Chemical Society, vol. 68, page 1525, (1946) by one of the instant applicants and co-workers. This drug has very effective antimalarial therapeutic properties, and, more particularly, has been found to have dramatic effects in the treatment of certain types of arthritis.

An improved technique for the production of primaquine and its homologs has now been found. Accordingly, this invention has for its object the production of primaquine and its homologs. Another object is the production of primaquine in superior yields and greater purity than heretofore obtainable. Other objects will be apparent as the ensuing description proceeds.

These objects are accomplished in accordance with this invention wherein primaquine and its homologs are produced by reacting 1,4-dibromopentane or 1,3-dibromobutane with potassium phthalimide dissolved in acetone to form a N-(bromoalkyl)-phthalimide, then reacting this formed compound with 6 - methoxy - 8 - amino-quinoline in a solvent to form 6-methoxy-8-α-methyl - ω - phthalimido alkylamino quinoline, then treating this latter product with hydrazine hydrate to liberate the free base of primaquine or its homolog, and reacting the free base with an acid to form a crystallizable salt of primaquine or the corresponding homolog.

In the production of primaquine in accordance with this invention the first step involves the condensation or reaction of 1-4-dibromo-pentane with potassium phthalimide in an acetone solution. During this reaction one bromine atom at the end of the pentane chain reacts with the alkali metal substituent of the phthalimide nucleus to produce as a by-product potassium bromide. The pentane radical is then directly united to the nuclear nitrogen atom of the phthalimide radical. It has been found that employing a stoichiometric excess of 1-4-dibromopentane is preferred inasmuch as the yields are greater. Generally, from 50 to 100% excess of dibromopentane is preferred on a molar basis. The temperature of the reaction is generally maintained at a temperature between 45° C. and 65° C. The temperature of boiling acetone under atmospheric conditions is about 56° C. and since acetone is a solvent for both reactants, it is, of course, preferred. The reaction can be brought to completion by heating the reactants in the presence of an excess of acetone over a steam bath and preferably the reaction vessel is provided with suitable means for condensing the evolved acetone vapors and returning them to the reaction vessel. The reaction is continued until the mixture is neutral to litmus, and, in general, from 24 to 30 hours of refluxing achieves the completion of the reaction. Preferably, the reaction vessel is provided with suitable means for stirring or otherwise intermixing the reactants during the course of the reaction. Upon completion of the reaction, the solution is filtered to remove the formed potassium bromide and the reflux condenser is removed and replaced by an ordinary condenser. The acetone and unreacted 1-4-dibromopentane are distilled off and recovered. The crude product is distilled under a vacuum to give a yield of 4-bromo-1-phthalimidopentane of about 67% of the theoretical. The product is a pale yellow oil.

The second step in the synthesis is to react 4-bromo-1-phthalimidopentane (hereinafter designated as Compound I) with 6-methoxy-8-aminoquinoline whereby the free bromine atom reacts with the hydrogen atom attached to the amino nitrogen of the quinoline compound to form 6-methoxy-8-(1-methyl-4-phthalimidobutylamino) quinoline. This reaction is accomplished by heating the reactants in a suitable solvent such as ethanol while stirring the reactants. In general, the reaction is completed in 60 to 72 hours and is facilitated by employing the quinoline compound in the proportions of about 2 mols. thereof to 1 mol. of Compound I. Upon completion of the reaction, ether is added to the mixture precipitating a solid. The filtrate is washed with aqueous potassium carbonate then with water and finally dried over magnesium sulfate. A yellow product crystallizes from solution upon the addition of alcohol and the removal of ether that has been identified as 6-methoxy - 8 - (1 - methyl - 4 phthalimidobutylamino) quinoline (hereinafter designated as Compound II).

The third step in the synthesis involves the removal of the phthalic acid group which leaves its nitrogen attached to the pentyl group and at the same time two hydrogen atoms replace the phthalic acid group. This is accomplished by reacting Compound II in alcohol with hydrazine hydrate at reflux boiling temperatures. After several hours the alcoholic solvent is distilled off until a solid begins to precipitate, the solid is then dissolved in aqueous potassium hydroxide and extracted into ether. The ether solution is then washed with water and dried over magnesium sulfate to yield an ether solution of the free base of primaquine. In order to purify the same and secure it in crystallizable form, it is neutralized to a suitable salt with an acid such as hydrochloric acid, oxalic acid, and, preferably, phosphoric acid. By the addition of oxalic acid dissolved in absolute alcohol a yellow precipitate of primaquine half oxalate (primaquine monooxalate) is secured. The precipitate is filtered off and recrystallized from 80% ethanol or from methyl Cellosolve. The half-oxalate salt melts at 182.5–185° C. and the diphosphate of primaquine melts at 197–198° C.

By replacing 1-4-dibromopentane with 1,3-dibromobutane, the corresponding homolog can similarly be prepared.

The following illustrative examples will show how the invention may be carried out but it is not limited thereto:

*Example I.—4-bromo-1-phthalimidopentane (I)*

A mixture of 2 moles of 1,4-dibromopentane and 1.5 moles of potassium phthalimide in 1.5 liters of acetone was stirred and refluxed for 24 hours. After filtering off potassium bromide and washing with acetone, the solvent and the excess 1,4-dibromopentane were distilled off. The crude material was distilled at about 167°/0.25 mm. At the beginning of the distillation some decomposition occurred causing phthalimide to sublime over with the distillate. A yield of about 67% of a pale yellow oil was obtained. The bromophthalimide gave the following analytical figures:

Calcd. for $C_{13}H_{14}BrNO_2$: C, 52.70; H, 4.76. Found: C, 53.23; H, 4.80.

NOTE 1.—In this preparation the use of acetone is vital as a solvent. When higher boiling solvents, e. g. ethyl alcohol, dioxane or xylene were used, extensive elimination of the secondary bromine as hydrogen bromide occurred with the formation of easily polymerizing unsaturated compounds.

A mixture of 2 moles of 6-methoxy-8-aminoquinoline and 1 mole of the side chain I in a liter of ethanol was refluxed with stirring for 72 hours. After cooling ether was added and the solid was filtered off and washed with ether.

The filtrate was washed with aqueous potassium carbonate then with water and dried over magnesium sulfate. After distilling off the ether, alcohol was added and the dark brown solution was boiled with decolorizing charcoal which removed a considerable amount of red color. If fairly pure starting materials are used a yellow product will crystallize slowly from the solution. The yield is 40–50%.

This material gave the following analytical figures:

Calcd. for $C_{23}H_{23}N_3O_3$: C, 70.93; H, 5.95. Found: C, 70.97; H, 5.76.

NOTE 1.—The preceding represents the preferred procedure. Alternate satisfactory procedure is given in the following.

A mixture of 0.05 mole of side chain (II) and 0.05 mole of 6-methoxy-8-aminoquinoline was added to 15 ml. of alcohol and a solution of 50 ml. of 0.05 mole of potassium dihydrogen phosphate buffered to pH 8 with about 0.05 mole of sodium hydroxide. The mixture was stirred and heated at 75–80° for 79 hours.

The dark brown oily layer was separated from the aqueous solution, washed with potassium carbonate solution, diluted with ether, and dried over magnesium sulfate. The solvent was distilled off and the remaining oil was dissolved in alcohol. On cooling a 49% crude yield of solid was obtained.

NOTE 2.—When crude side chain (not distilled) was used in the alkylation the product (II) remained dark even after charcoal treatment. Instead of crystallizing, a brown oil precipitated out. The oily material was treated with aqueous hydrogen bromide in order to precipitate the hydrobromides of the unreacted nucleus and of the phthalimido quinoline compound (II). The two may be separated by extractions with hot benzene since 6-methoxy-8-aminoquinoline hydrobromide is rather insoluble in this solvent. After treating the benzene extracts with excess aqueous potassium hydroxide, the solvent was distilled off. The resulting pale yellow oil may then be crystallized from alcohol yielding II.

*Hydrolysis of the intermediate II.*—The phthalimido compound (II) was hydrolyzed by refluxing its alcoholic solution with the calculated amount of hydrazine hydrate for two hours. Alcohol was distilled off until solid began to be deposited. The solid was dissolved in aqueous potassium hydroxide and extracted into ether. After washing the ether solution with water it was dried over magnesium sulfate.

The half-oxalate was precipitated out of this ether solution by the addition of the calculated amount of oxalic acid dissolved in absolute alcohol. The yellow precipitate may be recrystallized from 80% ethanol or from methyl Cellosolve. The yield in this step is 80%.

As thus obtained the half oxalate of SN–13,272 melts at 182.5–185° C. It gives the following analytical figures:

Calcd. for $(C_{15}H_{21}N_3O)_2.H_2C_2O_4$: C, 63.14; H, 7.29. Found: C, 63.11; H, 7.53.

The drug may also be obtained as the di-phosphate as follows: A solution of 85% phosphoric acid in 95% ethanol was added with shaking to a dilute ether solution of the drug base. A light yellow solid precipitated. On further addition of phosphoric acid in the amount calculated to form the diphosphate, this yellow solid turned orange and oily. After decantation of the solvent, the oil crystallized on addition of alcohol. After recrystallization from 90% alcohol the diphosphate melted at 197–198° C. It gave the following analytical figures:

Calcd. for $C_{15}H_{21}N_3O.2H_3PO_4$: C, 39.56; H, 5.97. Found: C, 40.16; H, 6.38.

NOTE 1.—The free drug base decomposes on attempted vacuum distillation no matter how high the vacuum. It is therefore necessary to precipitate the salt directly from a solution of the base.

*Example II.—Using excess 6-methoxy-8-aminoquinoline—preliminary heating without solvent*

A mixture of 0.05 mole of 4-bromo-1-phthalimidopentane and 0.1 mole of 6-methoxy-8-aminoquinoline was heated in an oil bath with stirring over a half hour period up to 125°. Heating was continued for an hour at 95–105°. During this heating process some solid material was formed, 6-methoxy-8-aminoquinoline hydrobromide.

Then 25 ml. of alcohol was added and the mixture was refluxed for eighteen hours. About 7 g. of 6-methoxy-8-aminoquinoline hydrobromide was filtered off. The remaining brown liquid was swirled with potassium carbonate solution and extracted with ether. The ether layer was dried over magnesium sulfate and the solvent was removed.

The oily residue was distilled, 103–127° at 7–10 microns. Solid began to precipitate and the distillation had to be stopped. Ether was added to the distilling flask. The solid did not dissolve but the glassy material at the bottom of the flask did. About 3.3 g. of solid was filtered off. On recrystallization from alcohol orange needle-like crystals were obtained, M. P. 235°. This may be a dialkylated product.

The ether solution was evaporated and the resulting oil was crystallized, with difficulty, from alcohol. About 4.8 g. of yellow solid was obtained representing 24% yield of the expected phthalimido intermediate. On recrystallizing twice more from alcohol the solid melted 89–90.5°.

*Example III.—Using excess 6-methoxy-8-aminoquinoline—heating in solvent*

A mixture of 0.05 mole of 4-bromo-1-phthalimidopentane and 0.1 mole of 6-methoxy-8-aminoquinoline in 25 ml. alcohol was refluxed on the steam bath for 67 hours. The crystalline 6-methoxy-8-aminoquinoline hydrobromide which was filtered off of the reaction mixture weighed 9 g. On the basis of this amount of hydrobromide recovered, about 71% of the side chain was used in the reaction.

The alcohol filtrate was shaken with an aqueous potassium carbonate solution and extracted with ether. The combined ether layers were washed with water, dried over magnesium sulfate and the ether was distilled off.

The oily material which remained was not distilled as in previous cases but was crystallized from alcohol, with some difficulty. A total of 9.9 g. was obtained, representing a 51% yield of intermediate phthalimido compound.

*Example IV.—Synthesis of 4-bromo-1-phthalimidopentane*

A mixture of 1.0 mole of potassium phthalimide and 1.5 mole of 1,4-dibromopentane in 1000 ml. of acetone was refluxed with vigorous stirring for thirty hours, or until the mixture was neutral to litmus.

After cooling, potassium bromide was filtered off and washed with acetone. The solvent and unreacted dibromopentane were distilled off of the filtrate at water pump pressure.

The product was distilled. It distilled at about 120–130°/.15 mm.; a 67% yield of pure product was obtained.

*Example V.—3-bromo-1-phthalimidobutane*

A mixture of 2 moles of 1,3-dibromobutane and 1.5 moles of potassium phthalimide in 1.5 liters of acetone was stirred and refluxed for 24 hours. After filtering off potassium bromide and washing with acetone, the solvent and excess 1,3-dibromobutane were distilled off. The residue consisted of a dark viscous oil, about 76% crude yield, which was used directly in the subsequent alkylation without further purification. An analytical sample was obtained by distillation at about 181°/0.3 mm. as a pale yellow oil.

Calcd. for $C_{12}H_{12}BrNO_2$: C, 51.09; H, 4.29. Found: C, 51.46; H, 4.35.

*Example VI.—6-methoxy-8-(3-amino-1-methyl-propylamino)-quinoline*

A mixture of 2 moles of 6-methoxy-8-aminoquinoline and 1 mole of 3-bromo-1-phthalimidobutane in a liter of ethanol was refluxed with stirring for 72 hours. After cooling, ether was added and the solid hydrobromide of 6-methoxy-8-aminoquinoline was filtered off and washed with ether.

The filtrate was washed with aqueous potassium carbonate, then with water and dried over magnesium sulfate. After distilling off the ether, alcohol was added and the dark brown solution was boiled with decolorizing charcoal. The product crystallized rather slowly and the addition of seed crystals was usually necessary. The yield is about 40%. An analytical sample of this material recrystallized several times from alcohol gave the following figures:

Calcd. for $C_{22}H_{21}N_3O_3$: C, 70.38; H, 5.64. Found: C, 70.47; H, 5.53.

The above phthalimido compound was hydrolyzed by refluxing its alcoholic solution with the calculated amount of hydrazine hydrate for two hours. Alcohol was distilled off until solid began to be deposited. The solid was dissolved in aqueous potassium hydroxide and extracted into ether. After washing the ether solution with water it was dried over magnesium sulfate.

The di-phosphate was precipitated out of this ether solution as follows: A solution of the calculated amount of 85% phosphoric acid in 95% ethanol was added with shaking to the dilute ether solution of the drug base. An oily orange deposit of the diphosphate resulted which crystallized on addition of alcohol after decantation of the original ether solution. After recrystallization from aqueous alcohol, the diphosphate melted at 210–211°. It gave the following analytical figures:

Calcd. for $C_{14}H_{19}N_3O \cdot 2H_3PO_4$: C, 38.09; H, 5.71. Found: C, 38.52; H, 6.07.

Since many apparently differing embodiments of this invention will occur to one skilled in the art, it is obvious that many changes can be made in the specific preferred embodiments disclosed above without departing from the spirit and scope of this invention.

What is claimed is:

1. A process for the production of primaquine which comprises reacting 1,4-dibromopentane with potassium phthalimide dissolved in boiling acetone to form N-(4-bromopentyl)-phthalimide, then reacting N-(4-bromopentyl) phthalimide with 6-methoxy-8-aminoquinoline in a solvent to form 6-methoxy-8-(1-methyl-4-phthalimidobutylamino) quinoline, treating this latter product with hydrazine hydrate to liberate the free base of primaquine, and reacting the free base with oxalic acid to form the mono-oxalate salt of primaquine.

2. A process for the production of primaquine which comprises reacting 1,4-dibromopentane with potassium phthalimide dissolved in boiling acetone to form N-(4-bromopentyl)-phthalimide, then reacting N-(4-bromopentyl) phthalimide with 6-methoxy-8-aminoquinoline in a solvent to form 6-methoxy-8-(1-methyl-4-phthalimidobutylamino) quinoline, treating this latter product with hydrazine hydrate to liberate the free base of primaquine, and reacting the free base with phosphoric acid to form the diphosphate salt of primaquine.

3. A process for the production of 6-methoxy-8-(3-amino-1-methylpropylamino) quinoline which comprises reacting 1,3-dibromobutane with potassium phthalimide dissolved in boiling acetone to form N-(3-bromobutyl)-phthalimide, then reacting N-(3-bromobutyl)-phthalimide with 6-methoxy-8-aminoquinoline in a solvent to form 6-methoxy-8-(3-phthalimido-1-methylpropylamino) quinoline, treating this latter product with hydrazine hydrate to liberate the free base of 6-methoxy-8-(3-amino-1-methylpropylamino) quinoline, and reacting the free base with phosphoric acid to form the diphosphate salt of 6-methoxy-8-(3-amino-1-methylpropylamino) quinoline.

4. A process for the production of a salt of a compound having the formula

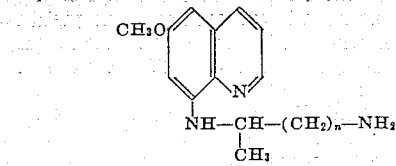

wherein $n$ is an integer selected from the group consisting of 2 and 3, which comprises heating a dibromoalkane selected from the group consisting of 1,4-dibromopentane and 1,3-dibromobutane with potassium phthalimide in a solvent to a temperature of about 45° C. to 65° C., then reacting the formed N-bromoalkylphthalimide with 6-methoxy-8-aminoquinoline in a solvent to form a 6-methoxy-8-(1-methylphthalimidoalkylamino)-quinoline, treating this latter product with hydrazine hydrate to liberate the free base by splitting off phthalic acid, and reacting the free base with an acid capable of forming a non-hygroscopic salt.

ROBERT C. ELDERFIELD.
ELEANOR WERBLE.

REFERENCES CITED

The following references are of record in the file of this patent:

UNITED STATES PATENTS

| Number | Name | Date |
|---|---|---|
| 1,938,047 | Schonhofer et al. | Dec. 5, 1933 |

OTHER REFERENCES

Elderfield et al.: J. Am. Chem. Soc., vol. 68, pp. 1524–1529 (1946).

Cope et al.: J. Am. Chem. Soc., vol. 71, pp. 554–561 (February 1949).

Baldwin et al.: J. Chem. Soc. (London), 1934, pp. 1264–1268.

Sidgwick: "Organic Chemistry of Nitrogen," (Oxford University Press; New York; 1942), pp. 14 and 15.